United States Patent [19]
Lin

[11] Patent Number: 5,835,885
[45] Date of Patent: Nov. 10, 1998

[54] OVER TEMPERATURE PROTECTION METHOD AND DEVICE FOR A CENTRAL PROCESSING UNIT

[75] Inventor: Huo-Yuan Lin, Taipei Hsien, Taiwan

[73] Assignee: Giga-Byte Technology Co., Ltd., Taoyuan, Taiwan

[21] Appl. No.: 869,967

[22] Filed: Jun. 5, 1997

[51] Int. Cl.⁶ .................................................. G06F 19/00
[52] U.S. Cl. ................. 702/99; 702/130; 364/528.34; 340/588
[58] Field of Search .................................. 364/557, 577, 364/579, 580, DIG. 1, 528.35, 528.34; 361/688, 694–697; 340/585, 588, 691, 521; 363/89; 702/99, 106, 130, 132

[56] References Cited

U.S. PATENT DOCUMENTS

| | | | |
|---|---|---|---|
| 3,876,999 | 4/1975 | Lee | 340/521 |
| 5,025,248 | 6/1991 | Bergeron | 340/596 |
| 5,073,861 | 12/1991 | Itoh et al. | 702/132 |
| 5,262,758 | 11/1993 | Nam et al. | 340/588 |
| 5,371,665 | 12/1994 | Quisenberry et al. | 363/89 |
| 5,398,597 | 3/1995 | Jones et al. | 364/577 |
| 5,566,062 | 10/1996 | Quisenberry et al. | 363/89 |
| 5,619,906 | 4/1997 | Ishida | 364/577 |
| 5,710,911 | 1/1998 | Walsh et al. | 395/555 |

*Primary Examiner*—John Barlow
*Assistant Examiner*—Bryan Bui
*Attorney, Agent, or Firm*—Bacon & Thomas, PLLC

[57] ABSTRACT

An over temperature protection method and its circuital device for a central processing unit includes a read and write memory unit having pre-stored therein; an instruction for identifying a type of CPU and automatically predetermining the maximum allowable over temperature for the CPU. An over temperature is detected by a heat sensitive resistance installed at the space immediately under the CPU to cause an audio frequency alarm circuit to output a sound alarm and also cause the CPU to slow down its operation speed to an appropriate reduced rate to prevent CPU from being damaged by over heat or other loss caused by interrupting CPU operation. After recovery of temperature to a normal value, the CPU can be instructed to operate with its normal speed.

4 Claims, 3 Drawing Sheets

| type of CPU | maximum allowable temperature | state of output signal of chip circuit | |
|---|---|---|---|
| | | 42 terminal foot | 43 terminal foot |
| INTER; AMD/K5 | 65 °C | 0 | 0 |
| CYIX; IBM | 70 °C | 1 | 0 |
| AMD/K6 | 75 °C | 0 | 1 |
| X | 80 °C | 1 | 1 |

*FIG. 2*

OVER TEMPERATURE PROTECTION METHOD AND DEVICE FOR A CENTRAL PROCESSING UNIT

BACKGROUND OF THE INVENTION

1. Field of the Invention

The present invention relates to an over temperature protection method and its circuital device for a central processing unit, and more particularly, an over temperature protection method and its related circuital device for a central processing unit (hereinafter, be abbreviated as to CPU) compatible with a conventional ventilating fan for dually protecting a CPU from being damaged due to temperature.

2. Description of the Prior Art

In the past, the operation speed of a computer CPU was so slow that it did not have a problem of over heating. But the operation speed has increased several times in this decade with rapid progress of computer software industry. Nowadays the operation speed of an average sized CPU has become so rapid that installation of heat dissipation fins or ventilation fans is no longer sufficient. As the temperature of a CPU becomes too high, not only the life of the computer will be affected, but the computer may even break down which is catastrophic in the fields such as national defense security, nuclear engineering or medical application etc. It is not the time for us to overlook the seriousness of CPU overheating, and moreover, now it is imperative that we should do something to solve this problem.

SUMMARY OF THE INVENTION

In view of the above described situation, it is a main object of the present invention to provide an over temperature protection method and its circuital device for a CPU which is able to automatically and directly instruct a CPU to decrease the rate of heat generation, and a method to reduce the basic ambient temperature to assure the security of the CPU, and maintain the operation information necessary for continuous instruction to the CPU for reducing heat generation.

It is another object of the present invention to provide an over temperature protection method and its circuital device for a CPU which is able to identify the type of CPU during operation and further, automatically select a predetermined detecting value for protection.

It is a further object of the present invention to provide an over temperature protection method and its circuital device which is able to warn the user by reducing heat generation by slowing down operation speed of CPU and informing the user of the situation that it is over heated, or that a conventional ventilation installation has failed, and at the same time, to warn the user with sound for double alarming.

The above mentioned objects of providing an over temperature protection method and its circuital device has been successfully realized through a long term study and experiment by the inventor.

The main advantage of the method and device of present invention is that it can effectively assure the security of CPU to operate normally without sudden failure caused by over temperature, and moreover, it is compatible with a conventional ventilation fan for dually protecting a CPU from being damaged by over temperature.

Another advantage of the method and device according to the present invention is that there are several ways of warning of over temperature states such as, decreasing operation speed, and displaying or alarming using sounds, which can selected by a user to effectively protect his CPU from being over heated.

A more complete understanding of these and other features and advantages of the present invention will become apparent from a careful consideration of the following detailed description of certain embodiments illustrated in the accompany drawings:

BRIEF DESCRIPTION OF THE DRAWINGS

FIG. 2 is a table enumerating recommended working temperatures of chips employed in different types of CPU.

DETAILED DESCRIPTION OF THE PREFERRED EMBODIMENT

Figure 1:
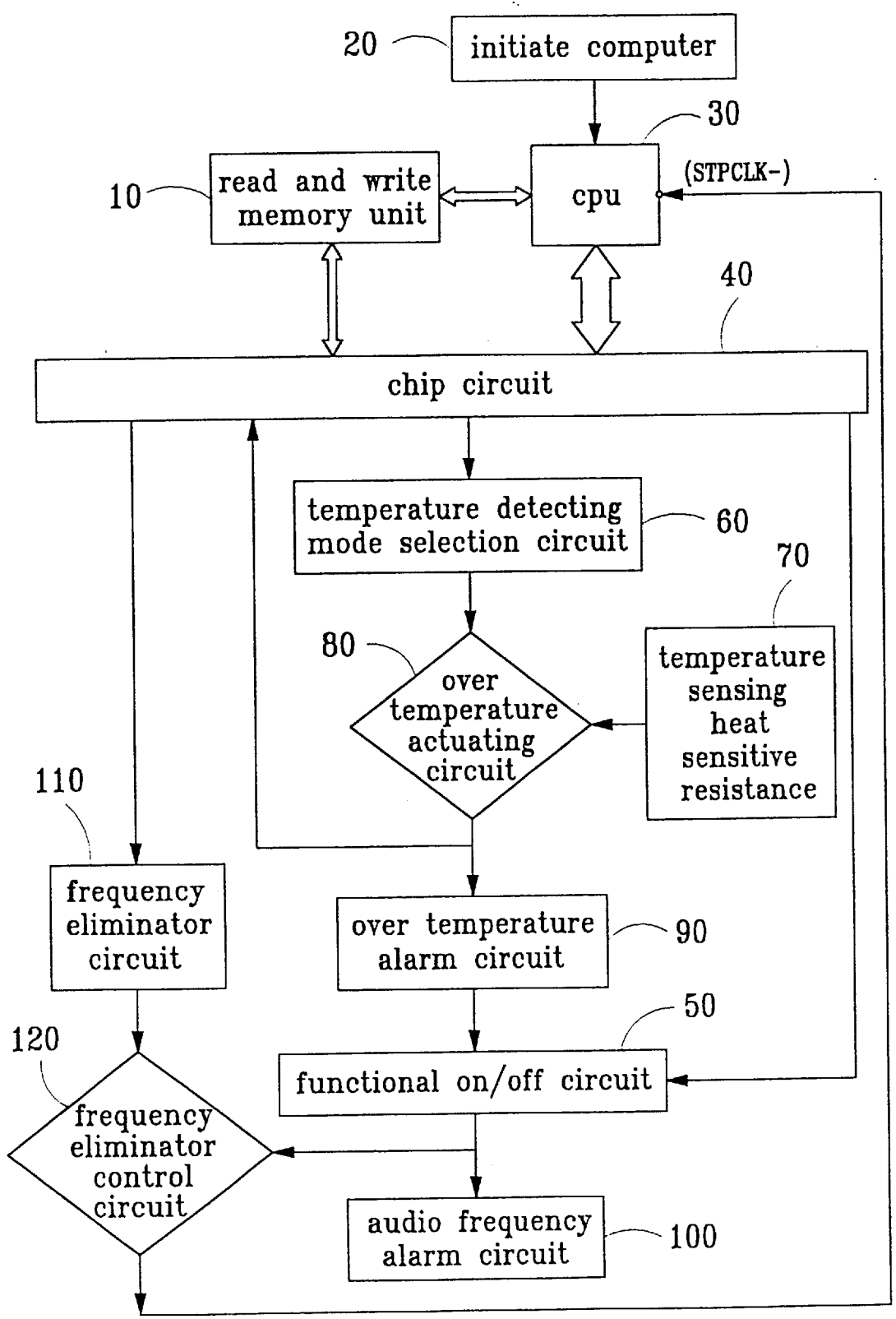
FIG. 1 is a drawing showing a flow chart of the over temperature protection method for a CPU of the present invention.

Referring to FIG. 1, showing a flow chart of the over temperature protection method for a CPU of the present invention, an on/off instruction and an instruction for identifying the type of CPU are pre-stored in a read and write memory unit (BIOS) so that when operation of the computer is initiated 20, CPU 30 will directly read the above mentioned instruction from the BIOS memory unit 10 and instruct a chip circuit (PIIx4 type chips) 40 to operate, and at the same time energize on/off function circuit 50. Circuit 50 is the main switch circuit for automatic control, and unless it is instructed to be in ON state, the device of the present invention does not function. Then the CPU 30 identifies its own type to select a mode for a temperature detecting mode select circuit 60 and match it with a temperature sensing heat sensitive resistance 70 installed adjacently right under said CPU 30.

As the working temperature of CPU 30 rises, the value of temperature sensing heat sensitive resistance 70 decreases linearly, and the potential of a resistor connected to its one terminal will inverse proportionally increase to a starting value as soon as the working temperature of CPU 30 reaches a predetermined value. Then an over temperature actuating circuit 80 is actuated and outputs a signal (LO) to an over temperature alarm circuit 90 for energizing it. At this time since both the pre-located functional ON/OFF circuit 50 and the over temperature alarm circuit 90 are cascadely grounded, an audio frequency alarm circuit 100 is energized and outputs a sound alarm, and the signal (LO) is sent to a chip circuit 40 via another circuit for the chip circuit 40 to output a (REFRESH) signal to a frequency eliminating circuit 110 to initiate it. At this time the output from the frequency eliminating circuit 110 is input to a frequency eliminating control circuit 120 to split the (SYSCLK) signal which is coming from the front of chip circuit 40, and control the (STPCLK) terminal 31 of CPU 30 with said split (SYSCLK) signal to slow down the operation speed of CPU 30. The heat generated from CPU 30 is therefore reduced to the extent which is able to assure CPU 30 to work continuously and keep effectively the information on line.

After the over temperature hazard is released, the over temperature switch circuit 80 returns to its de-energized state and other circuits also recover their normal states without any output.

Accordingly, CPU 30 recovers its operation with normal speed. Of course the user may take appropriate responses such as inspecting the inner part of the computer or replacing the heat dissipating equipment etc. without haste during the dual emergency state of slowing down of CPU 30 in response to sound alarm, or afterwards asks for an experienced engineer to make a thorough inspection.

Referring to the table of FIG. 2, which is a table enumerating recommended maximum working temperatures of chips employed in different types of CPU, wherein the recommended temperatures are 65° C. for INTEL and AND/K5, 70° C. for CYRIX and IBM, 75° C. for AND/K6, 80° C. for X respectively. The above recommendation is made based on the variation of output value between 0 and 1 of the output terminals (e.g. #GP00 and GP08) of the chip circuit 40, and is also the basis of deciding whether the resistances R61, R62 and R63 are to be connected in parallel, or in any other forms, and to allot the ratio of working voltage between the heat sensitive resistance 70 and the resistances R61, R62, and R63 in order to determine the detecting temperature. In the illustrated embodiment, the values of over temperature for GP00 and GP08 are determined as 65° C. at(0,0), 70° C. at (1,0), 75° C. at (0,1) and 80° C. at (1,1). By means of decreasing the heat sensitive resistance 70 and connecting a resistance in series to the other terminal, the object of increasing a predetermined value of over temperature is attained. Decreasing the predetermined value of over temperature may be carried out in a reversed way.

Figure 3:
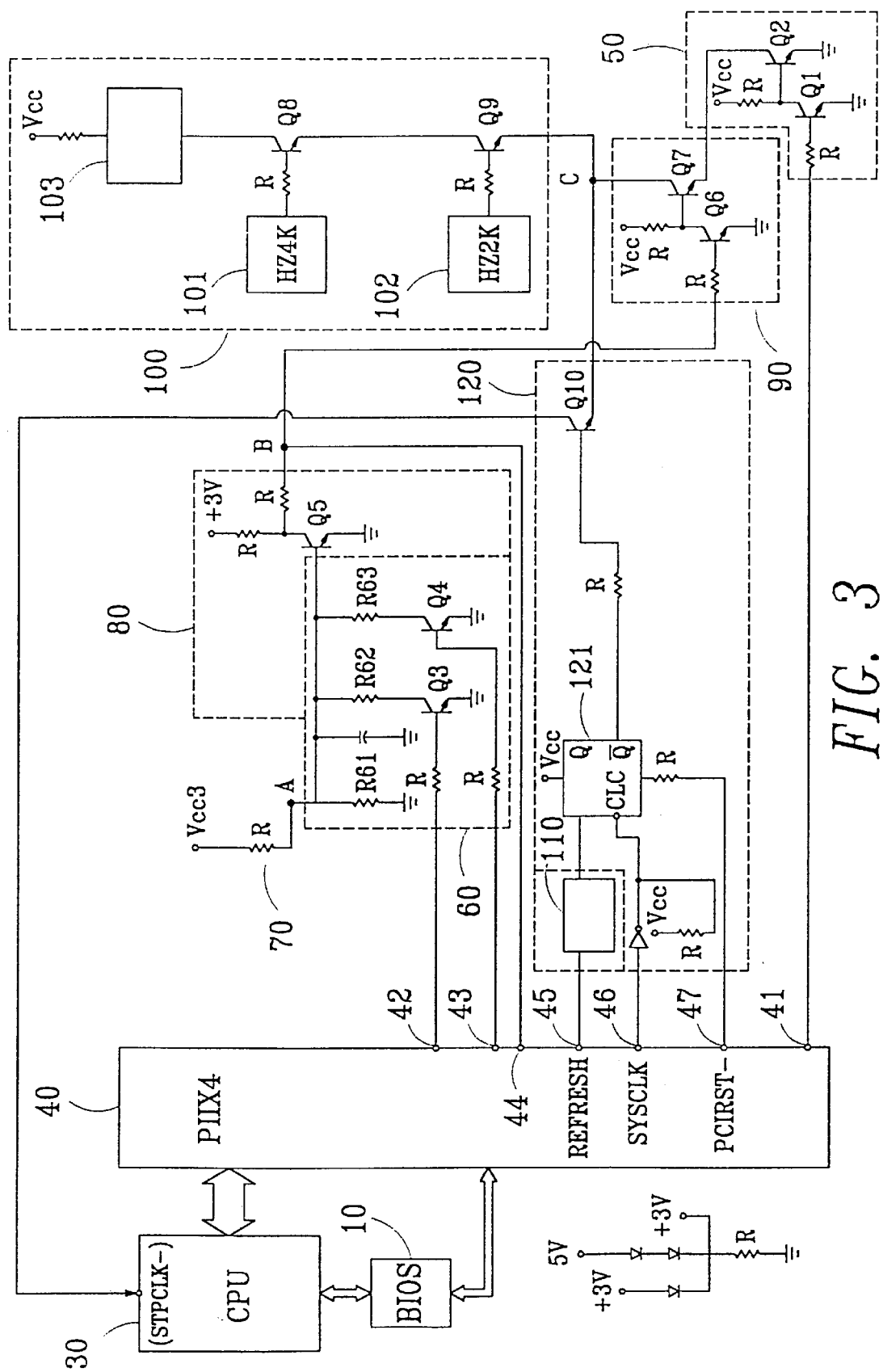
FIG. 3 is a drawing of circuital layout of over temperature protection for a CPU in a preferred embodiment of the present invention.

Referring to FIG. 3, which is a circuital layout of over temperature protection for a CPU in the preferred embodiment of the present invention, the circuit of the present invention comprises a read and write memory unit (BIOS) 10, a CPU 30 for matching the computer, a chip circuit (PIIx4 type chips) 40, a functional on/off circuit 50 composed of transistors $Q_1$, $Q_2$, a temperature detecting mode selection circuit 60 principally formed of transistors $Q_3$, $Q_4$ and selection resistances R62, R63, R61 connected in parallel, a temperature sensing heat sensitive resistance 70 connected in series to said temperature detecting mode selection circuit 60, an over temperature actuating circuit 80 principally formed of a transistor $Q_5$, an over temperature alarm circuit 90 principally formed of transistors $Q_6$, $Q_7$, an audio frequency alarm circuit 100 composed of oscillators 101, 102, transistors $Q_8$, $Q_9$ and speaker 103, a 1/16 frequency eliminating circuit 110, and a frequency eliminator control circuit 120 principally composed of a flip-flop 121 and a transistor $Q_{10}$, wherein the functional on/off circuit 50 may be replaced by a switch means to be manually operated, and switching of the resistance R62, R63 may be carried out by manual switches and their ratio can also be adjusted by employing the resistances having positive temperature coefficient in coordination with the heat sensitive resistance 70. The frequency eliminating circuit 110 may be enlarged and include more components to select other values of frequency for elimitating. The chip circuit 40 also may be enlarged to increase its functions so as to control a conventional ventilation fan.

Referring now to FIGS. 1, 2 and 3, the operational principle of the circuital device of the present invention is described as follows: Upon initiating computer 20, CPU 30 identifies read and write memory unit 10 and instructs 41 terminal of the chip circuit 40 to output a (LO) signal to turn off transistor $Q_1$ and turn on transistor $Q_2$, and a signal is output from terminal 46 (PCIRST−) to clear flip flop circuit 121. As the temperature sensing heat sensitive resistance 70 is heated to reduce its resistance to a predetermined value, the potential at point A rises to turn on transistor $Q_5$, at which moment point B becomes the (LO) state (LO), at which transistor $Q_6$ turns off, and transistor $Q_7$ turns on, causing point C to then be at a grounded state. Thus, being driven by oscillators 101, 102, transistors $Q_8$, $Q_9$ oscillate and drive the speaker 103 to produce an alarming sound, and at the same time, the (LO) state at point B is transmitted to terminal 44 (GPI8) of chip circuit 40 via another circuit. Then at the terminal 45 (REFRESH) of chip circuit 40, a signal for frequency eliminator circuit 110 is output to produce a 1/16 eliminated frequency output, which reacts with the clock output from terminal 46 (SYSCLK) of the chip circuit 40 in the flip flop 121 and drives transistor $Q_{10}$ to repeat on/off operation with the rate of 1/16 (SYSCLK) clock.

Next, the signal is input to the terminal (STPCLK−) of CPU 30 connected to the collecter of $Q_{10}$ and slows down the running speed of CPU 30 to 1/16 that of its original one, and also reduces heat generation rate. In such way, the accumulated heat is dissipated gradually and the danger of CPU 30 being damaged by over temperature is released thereby. After the temperature of CPU 30 goes down, the resistance of heat sensitive resistance rises up to a certain value, the potential of point A decreases correspondingly so that transistor $Q_5$ returns to its normally turn off state, and at this moment the potential of point B also is recovered to its normal state (HI), and transistor $Q_6$ turns on again while transistor $Q_7$ turns off, while point C recovers its open circuit state, the audio frequency alarm circuit 100 stops outputting and the input signal of terminal 44 (GP18) of chip circuit 40 also recovers to a (HI) state. Accordingly, terminal 45 of chip circuit 40 stops outputting the (REFRESH) signal, the flip flop 121 stops outputting and transistor $Q_{10}$ turns off, at which terminal (STPCLK−) of CPU 30 recovers its normal state and CPU 30 recovers its normal operation speed too.

It is clear from the above description that, the advantage of the method and device according to the present invention is that, it can effectively assure security of the CPU to operate normally without failure caused by over temperature and moreover it is compatible with a conventional ventilation fan for dually protecting a CPU from being damaged due to over temperature.

Although the present invention has been described with a certain degree of particularity, the present disclosure has been made by way of example and changes in details of structure may be made without departing from the spirit thereof.

What is claimed is:

1. An over temperature protection method for a central processing unit (CPU), comprising the steps of:

first, pre-storing an on/off instruction and an instruction for identifying a type of CPU in a read and write memory unit of a basic input/output system (BIOS) circuit when the CPU is initialized, and causing the CPU to directly read the instruction from said BIOS memory unit and instruct a chip circuit to operate, and at the same time energizing a main switch of an on/off function circuit, second, selecting a mode for a temperature detecting mode select circuit based on identification by said CPU of its own type, and matching the selected mode with a temperature sensing heat sensitive resistance installed adjacently under said CPU so that as a working temperature of the CPU rises, the value of temperature heat sensitive resistance linearly varies, and the potential of a resistor connected to one terminal of the temperature heat sensitive resistance also varies inverse proportionally to a starting value, until the working temperature of the CPU has reached a predetermined value, third, actuating an over temperature circuit to output a signal to an over temperature alarm circuit for energizing the over temperature alarm circuit, at which time, since both the on/off circuit and the over temperature alarm circuit are mutually cascadely grounded, an audio frequency alarm circuit controlled by the functional on/off circuit is energized, fourth, outputting an audible alarm from said audio frequency alarm circuit and sending said signal to the chip circuit via another circuit, fifth, outputting a signal from said chip circuit to a frequency eliminating circuit to initiate the frequency eliminating circuit, sixth, inputting the output from said frequency eliminator circuit to a frequency eliminating control circuit to split a system clock signal output by said chip circuit to slow down an operation speed of the CPU, and, finally, after the heat generation by the CPU is reduced due to said slow down to a value which is able to ensure that the CPU will work continuously without interrupting flow of information being processed, and an over temperature hazard is released, returning the over temperature circuit to a de-energized state and restoring other circuits to their normal state without any output.

2. The method as claimed in claim 1, wherein said temperature detecting heat sensitive resistance is installed in a space adjacently right under said CPU.

3. An over temperature protection circuit device for a central processing unit (CPU), comprising:

a read and write memory unit of a basic input/output system (BIOS) circuit matched with the CPU of the computer;

a chip circuit;

a functional on/off circuit;

a temperature detecting mode selection circuit principally formed of transistors $Q_3$, $Q_4$ and at least one selection resistance connected in parallel;

an over temperature actuating circuit;

an over temperature alarm circuit:

an audio frequency alarm circuit composed of oscillators, transistors and a speaker;

a frequency eliminating circuit; and, a frequency eliminating control circuit, wherein said frequency eliminator circuit is enlarged and includes additional components to select other values of frequencies to be eliminated.

4. An over temperature protection circuit device as claimed in claim 3, wherein the resistance employed in said temperature detecting mode selection circuit is a resistance having a positive temperature coefficient of resistance for cooperatively operating with said heat sensitive resistance.

* * * * *